United States Patent [19]
Campbell et al.

[11] Patent Number: 5,145,195
[45] Date of Patent: Sep. 8, 1992

[54] STEERING SKIS FOR SNOWMOBILES AND SIMILAR VEHICLES

[76] Inventors: Norman A. Campbell, Box 452, New Liskeard, Ontario P0J 1P0; Donald G. Campbell, R.R. #1, Callander, Ontario P0H 1H0, both of Canada

[21] Appl. No.: 615,265

[22] Filed: Nov. 19, 1990

[30] Foreign Application Priority Data

Oct. 24, 1990 [CA] Canada .................................. 2028471

[51] Int. Cl.⁵ .............................................. B62B 17/02
[52] U.S. Cl. ...................................... 280/28; D21/229
[58] Field of Search .............. 280/28, 606, 609, 28.14, 280/28.15, 28.16, 601; 180/190; D21/228, 229; 441/68

[56] References Cited

U.S. PATENT DOCUMENTS

| D. 170,888 | 11/1953 | Paden et al. | D21/229 X |
|---|---|---|---|
| 1,464,204 | 8/1923 | Knowles | 280/28 |
| 2,539,817 | 1/1951 | Ditter | 280/28 X |
| 3,482,849 | 12/1969 | Puetz | 280/28 |
| 3,593,814 | 7/1971 | Bauler | 280/28 X |
| 3,605,926 | 9/1971 | Leonawicz | 180/190 |
| 3,613,809 | 10/1971 | Chaumont | 280/26 X |
| 3,643,979 | 2/1972 | Richards | 280/28 |
| 3,645,347 | 2/1972 | Brant | 280/28 X |
| 3,675,939 | 7/1972 | Vik | 280/28 |
| 3,692,130 | 9/1972 | Stacy, Jr. | 180/190 |
| 3,711,109 | 1/1973 | Hofbauer | 280/28 |
| 3,732,939 | 5/1973 | Samson | 280/28 X |
| 3,765,695 | 10/1973 | McGregor | 280/28 |
| 3,817,544 | 6/1974 | Labelle | 280/28 |
| 3,870,331 | 3/1975 | Cryderman | 280/28 |
| 3,897,839 | 8/1975 | Brisebois | 280/28 X |
| 3,920,091 | 11/1975 | Kuwano et al. | 180/190 |
| 3,964,561 | 6/1976 | Lunzer et al. | 280/28 X |
| 4,491,333 | 1/1985 | Wernke | 280/28 |
| 4,722,539 | 2/1988 | Molinaro | 280/609 X |

FOREIGN PATENT DOCUMENTS

435061 10/1926 Fed. Rep. of Germany ...... 280/609

Primary Examiner—Andres Kashnikow
Assistant Examiner—Brian L. Johnson

[57] ABSTRACT

Steering skis for snowmobiles and similar vehicles. The ski has a lower surface for contacting the snow and at least one upwardly curved lateral edge in a region of the ski used for support of the vehicle. The curved lateral edge defines a convex curved snow-engaging surface which merges smoothly with the lower surface of the ski. The curved edge generates lift during turning of the ski while minimizing drag characteristics of the ski. The ski is less likely to result in tipping during turns at high speed in deep snow, which improves the safety of the vehicle. The curved edge produces minimal drag while turning and this allows for more use of the lift generated by the ski.

12 Claims, 11 Drawing Sheets

STEERING SKIS FOR SNOWMOBILES AND SIMILAR VEHICLES

BACKGROUND OF THE INVENTION

I. Field of the Invention

This invention relates to steering skis used for snowmobiles and similar vehicles intended to travel over snow and ice.

II. Background Art

Snowmobiles and similar vehicles are generally provided with a pair of skis at their front ends intended to support the vehicles without sinking unduly into the snow and also intended to provide steering when turned from side to side.

Conventionally, a steering ski of this kind has a generally flat lower surface, usually provided with an elongated central downward projection (often referred to as a keel) extending from the lower surface and intended to dig into the snow below the ski in order to resist lateral sliding when the vehicle is turning. The front end of such a ski usually has an upturned pointed tip to ensure that the ski rides on the snow rather than becoming buried deeply in it.

A disadvantage of conventional steering skis is that they usually cannot be turned in deep snow at high speed without a considerable risk of uncontrollably tipping the vehicle completely over. This is because the lateral edge of the leading ski may dig into the snow rather than ride over it. As the vehicle turns, the extra drag caused by the angled skis produces a braking action which rolls the vehicle to the outside of the curve and this tends to make the leading edge of the leading ski dig more deeply into the snow. Naturally, this introduces a considerable element of danger, particularly for inexperienced riders.

Wayne L. Warnke in U.S. Pat. No. 4,491,333 issued on Jan. 1, 1985 disclosed a ski which is said to have improved turning performance. The Warnke ski has upward flares provided along both lateral edges of the skis to create a lifting force on the ski during turning. As explained in the Warnke patent (Column 2, lines 46 to 50 and the drawings), the flare at the edges of the ski is formed by a flat surface extending abruptly upwardly and outwardly from the lower surface of the ski at an angle of 30°–60°, and preferably at about 45°.

Despite the improvement claimed by Warnke, we have found that steering skis of this kind still suffer from poor performance during turning. The skis tend to throw up a great deal of snow during turning, which affects visibility and produce a considerable amount of drag. This drag creates a braking action on the machine which results in additional weight transfer to the outside ski which in turn counteracts the lift the ski is trying to create. As a result, skis of this kind offer very little improvement in practice over conventional skis.

OBJECTS OF THE INVENTION

It is therefore an object of the present invention to provide a steering ski for a snowmobile or similar vehicle which avoids or reduces the disadvantage mentioned above.

It is another object of the invention to provide a steering ski for a snowmobile or similar vehicle which generates favourable lift to drag characteristics when turning.

It is yet another object of the invention to provide a steering ski for a snowmobile or similar vehicle which reduces the amount of snow thrown up during turning compared with conventional steering skis.

SUMMARY OF THE INVENTION

According to the present invention, there is provided a steering ski for a snowmobile or similar vehicle intended for travel over snow, said ski comprising: a lower surface for contacting the snow; and an upwardly curved lateral edge, at least on one side of the ski in a region of the ski used for support of the vehicle; wherein said curved lateral edge defines a convex curved snow-engaging surface which merges smoothly with said lower surface of the ski.

The curved lateral edge is preferably provided only on the side of the ski intended to be the outside lateral edge when the ski is installed on a snowmobile or similar vehicle. Only the outer (leading) ski in a turn normally needs to create additional lift, so only the outer edges of the skis normally require the curved surfaces of the present invention. It may even be undesirable to provide pronounced upward curves on the inner edges of the skis because the trailing ski in a turn tends to lift and a pronounced upward curve on the leading edge of such a ski would further aggravate the lift naturally present at the inner side of the snowmobile. However, in some instances it may be advantageous to provide the inner edge of the ski with a short, shallow upward curve, as will be explained more fully later.

BRIEF DESCRIPTION OF THE DRAWINGS

For the sake of simplicity, throughout the several views of drawings, like (but not necessarily identical) parts of illustrated articles are identified by the same reference numerals.

DETAILED DESCRIPTION OF THE PREFERRED EMBODIMENTS

In the present invention, at least in its preferred forms, a steering ski for a snowmobile or similar vehicle is provided with an upward curve along at least the outer lateral edge of the ski but, in contrast to the flare used by Warnke in the patent mentioned above, the ski of the present invention has a curved rather than a flat surface extending smoothly upwardly and outwardly from the lower surface of the ski. Surprisingly, this makes a considerable difference to the performance of the ski, as will be apparent from the test results provided later.

Figure 1:
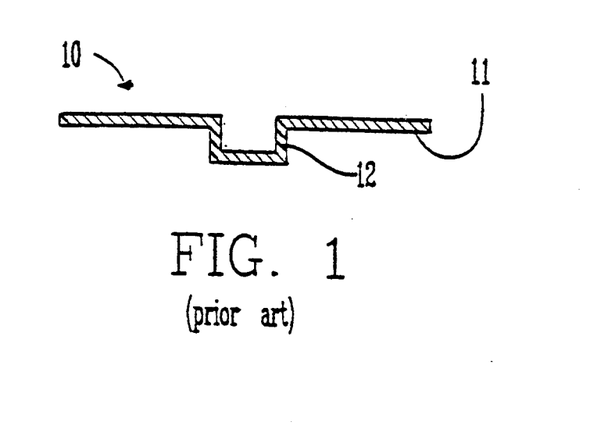
FIG. 1 is cross-section of a conventional snowmobile ski.

FIG. 1 of the drawings is a cross-section of a conventional ski at a point along its support surface (as opposed to its upwardly curved front tip). The ski 10 has a lower surface 11 which contacts the snow or ice (not shown) and a short rectangular keel 12 projecting downwardly from the center of the lower surface to provide steering control. The keel 12 extends for approximately the full length of the ski, at least in the region of the support surface.

Figure 2:
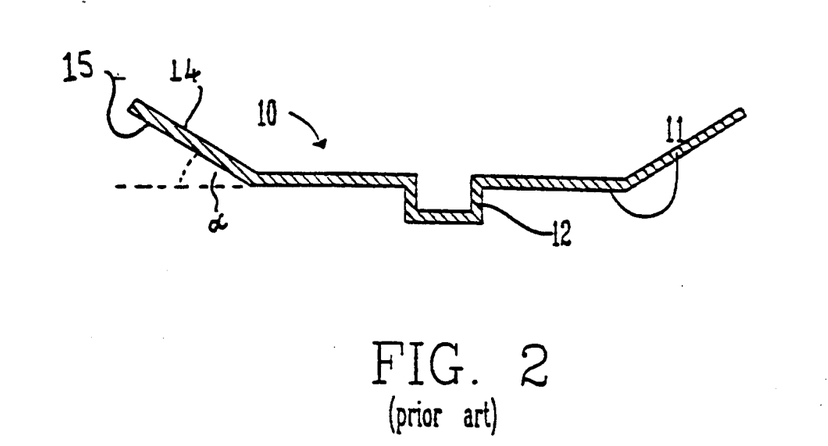
FIG. 2 is a cross-section of a ski according to U.S Pat. No. 4,491,333 to Warnke.

FIG. 2 is a cross-section similar to FIG. 1 of the ski disclosed in the Warnke patent mentioned above. The ski has the same parts as the ski of FIG. 1 except that the lateral side edges of the ski have upward flares 14 forming upwardly and outwardly extending flat surfaces 15 arranged at an acute angle $\alpha$ to the lower surface 11. It will be seen from the drawing that the outer (snow-engaging) surface 15 of the curve and the lower surface 11 of the ski meet abruptly, i.e. there is no substantial rounding or smoothing at the line of juncture. As noted above, in this prior art ski, it is stated that the angle $\alpha$ may be in the range of 30°-60°, but the preferred angle is 45°.

Figure 3:
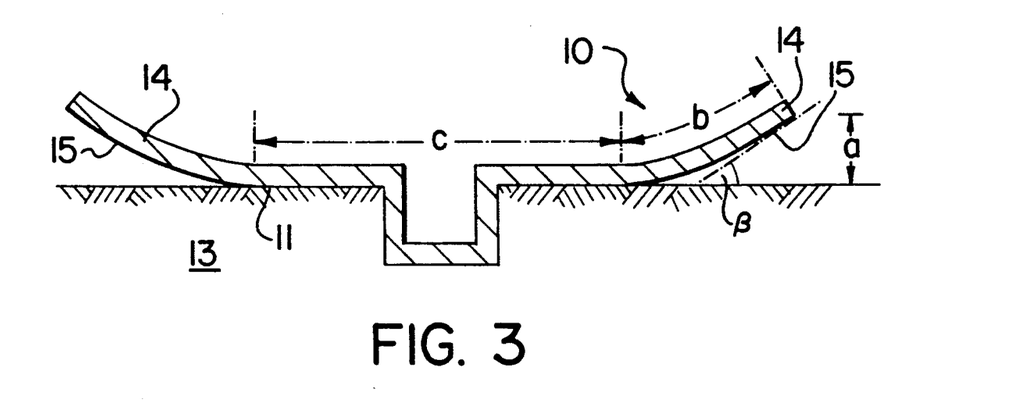
FIG. 3 is a cross-section of a ski according to a first preferred embodiment of the present invention.

FIG. 3 is a cross-section similar to those of FIGS. 1 and 2 showing a steering ski according to one preferred embodiment of the present invention supported on a layer 13 of snow. The ski differs from the ski of FIG. 2 in that the edges 14 have convex curved outer (snow engaging) surfaces 15 extending upwardly and outwardly from the lower surface 11 of the ski 10. The curve may be in the form of an arc of a circle, a portion of an ellipse, a portion of a parabola, a smooth series of contiguous curves of different radii (referred to as a stepped bend), or any other curved shape. Most preferably, however, the surface 15 is provided with an "accelerating" curve, i.e. a curve having a radius of curvature which decreases as the distance from the lower surface 11 increases. Gradual curves of this type have clean flow characteristics, i.e. they tend to throw up less snow during turning, and as a result create more usable lift and less drag.

A critical requirement of the curve is that it must merge with the lower surface 11 in a smooth, preferably tangential fashion so that the edge of the ski can ride over the surface of the snow or ice without generating the amount of drag which results from the abrupt change of angle present in the Warnke design. In the present invention, the surface 15 preferably meets the surface 11 along a curve having a minimum radius of curvature of about 0.5 inches, and more preferably at least 0.75 inches.

The curve 14 generally rises to a vertical height a above the lower surface 11 in the range of 0.5 to 4.5 inches over a horizontal distance of 3 inches, and generally has a width b in the range of 3 to 4 inches. The preferred dimensions are about 1.5 inches for a and about 4 inches for b. In general, the horizontal width c of the central portion of the ski is in the range of 3 to 5 inches, and is preferably about 4 inches.

Figure 4:
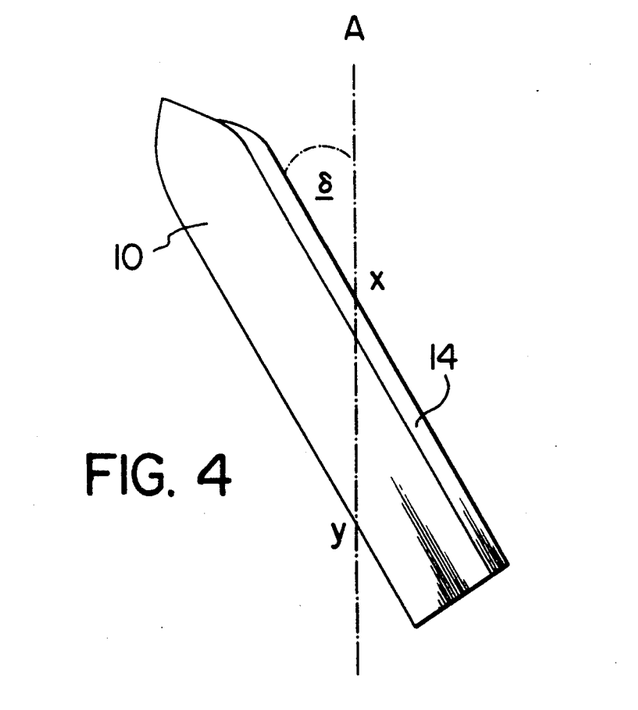
FIG. 4 is a plan view of a ski according to a second preferred embodiment of the invention executing a turn, this ski having a curved edge 14 on the outer side only of the ski.

Another important aspect of the present invention is the angle at which the curve 14 extends upwardly relative to the lower surface 11. Since the surface 15 is not flat, the angle changes at different points along the curve (i.e. it increases as the distance from the lower surface 11 increases), but the "final" angle (i.e. angle $\beta$ B in FIG. 3) between the surface 15 at the extreme outer end of the snow contacting region and the lower surface 11, should generally not be greater than an angle which, during a turn, causes the snow to meet the curve 14 at a maximum angle of about 45° and desirably at an optimum angle of about 30° when the ski is turned to its maximum extent permitted for steering. As will be appreciated from FIG. 4, when a snow vehicle originally travelling in a direction A begins a turn, the leading ski 10 turns at an angle $\delta$ to the direction of motion and the onrushing snow therefore encounters the ski 10 at this oblique angle rather than at right angles, as might be imagined from the transverse cross-sectional views of FIGS. 1 to 3. The maximum value of angle $\delta$ allowed by vehicle steering mechanisms is generally about 30°. Since the snow encounters the ski obliquely, the effective upward angle of the curve 14 is reduced from the angle $\beta$ shown in FIG. 3 since the profile of the ski along the line X-Y of FIG. 4 governs the operation of the ski. This profile is shown in the cross-sectional view of FIG. 5, from which it will be seen that the effective width of the ski is increased (approximately doubled) and the effective final angle $\beta'$ relative to the lower surface 11 is reduced.

Figure 6:
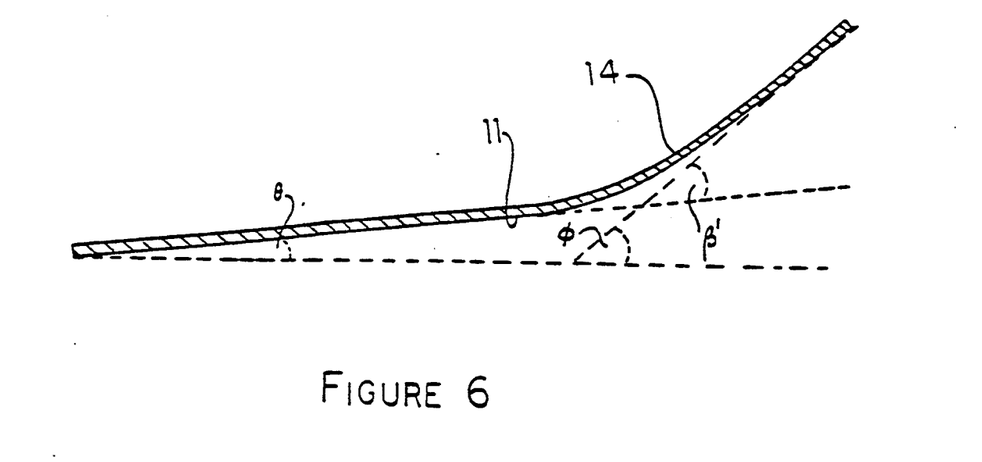
FIG. 6 is a view similar to FIG. 5 showing the angle of tilt of the ski.

However, the vertical angle at which the curve 14 meets the snow depends not only on the effective final angle $\beta'$ of the curve 14 relative to the flat bottom surface 11 of the ski, but also on the angle of the ski as a whole relative to the horizontal snow surface. This is important because, in most snowmobiles and similar vehicles, the axis around which the ski pivots during steering is not precisely vertical but instead slopes rearwardly from the vertical by a small caster angle usually of about 15°. This has the effect of tilting the skis upwardly during cornering relative to the snow surface by a small angle $\Theta$ (see FIG. 6) which increases as the steering angle $\delta$ increases, thus raising the overall angle of attack $\phi$ of the curve 14 and making the curve more "aggressive". At the usual maximum steering angle of about 30°, the upward angle of tilt $\Theta$ of the leading edge of the ski caused by the caster angle is about 8°. To allow for this, in order to maintain the overall angle of attach $\phi$ ($\beta'+\Theta$) at the desired optimum of about 30°, the effective final angle $\beta'$, and correspondingly the transverse final angle $\beta$, of the curve 14 should be reduced accordingly.

In practice, in the case of a vehicle ski having an (upward angle of tilt 73 of 8° at the maximum steering angle $\delta$, the transverse angle $\beta$ (i.e. the angle shown in FIG. 3) should have an optimum maximum value of about 39°. This causes the value of the effective angle $\beta'$ at the maximum steering angle $\delta$ to be about 22°, which corresponds to an overall angle of attack ($\beta'+\Theta$) relative to the snow of about 30°. It is believed that, following this description, the optimum angle $\beta$ for other skis and vehicles may easily be calculated by persons skilled in the art according to the caster angle and maximum steering angle of the vehicle in question.

As far as the angle of attack relative to the snow is concerned, while the optimum value has been stated, there is no precise minimum value, but the amount of lift generated by the curve 14 will be reduced as the angle $\beta$ is reduced, and so it is preferable to make the angle as close as possible to the optimum.

It has been stated above that the outer surface 15 of the edge 14 is curved, preferably in an accelerating manner. However, it has been found that the upper region of the surface 15 adjacent to the upper edge of the curve 14 may in some cases have to be made flat (planar) in order to accommodate a ski of the desired width and height required to ride over the snow without making the final angle exceed the optimum required by the above considerations. In other words, in those cases where a curve equation would causes the surface 15 to slope at the maximum permissible final angle at some point along the surface short of the upper edge of the curve, the surface must be made flat beyond that point so that the maximum angle is not exceeded.

Figure 7:
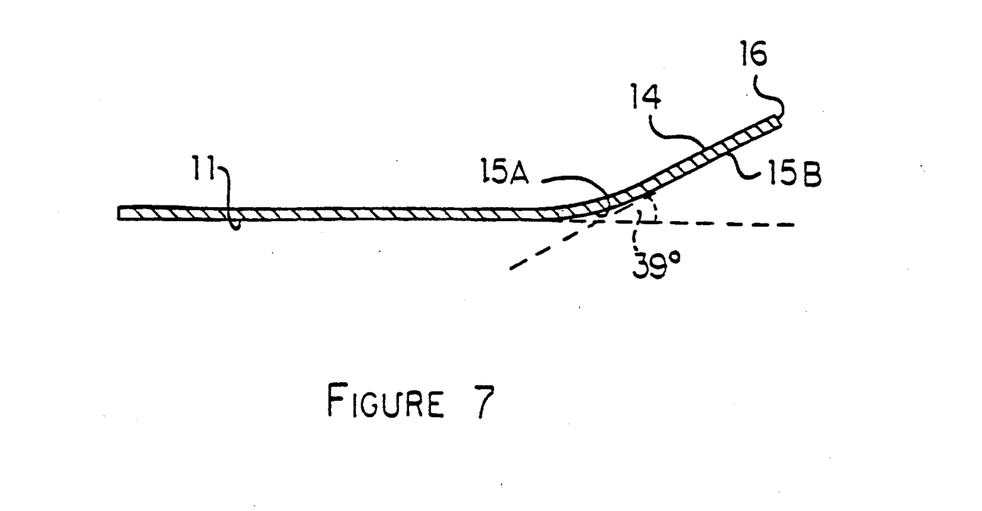
FIG. 7 is a cross-section of a ski according to a third preferred embodiment of the present invention.

A cross-section of a ski according to the invention having a flat outer surface at the upper end of the curve 14 is shown in FIG. 7. Of course, the equation of the curve must not make the bottom part of the ski curve so abruptly that the required smooth merging of this part of the surface 15 with the lower surface 11 of the ski is sacrificed. Again, it must be stated that the minimum radius of curvature immediately adjacent to the line of juncture is preferably about 0.5 inches.

The provision of an upper flat portion in those cases where it is desired permits the improved lift to be retained without sacrificing smooth flow and low drag.

A particularly preferred curve is one defined by the following equation having a final angle of approximately 39°:

$$y = 0.065 + 0.1106x + 0.026x^2 - 0.0003x^3$$

wherein y is the vertical coordinate of the curve and x is the horizontal coordinate of the curve.

Figure 5:
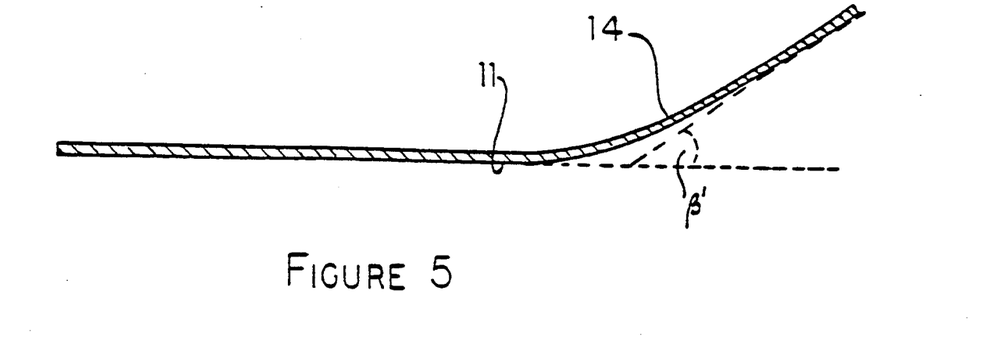
FIG. 5 is a cross section of the ski of FIG. 4 along the line X-Y.
Figure 8:
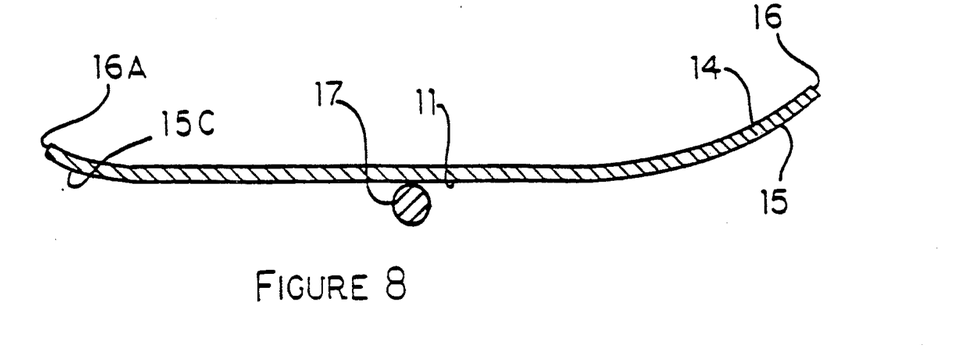
FIG. 8 is a cross-section of a ski according to a fourth preferred embodiment of the present invention.

The ski of FIG. 8 is similar to the ski of FIG. 5 except that the inner edge 16A has a short shallow curve providing an outwardly curved snow-engaging surface 15c. This curved surface produces minimal lift, but reduces drag because it avoids the inner edge of the ski ploughing into the snow. Skis of this type consequently have edges provided with asymmetric curves. The ski of FIG. 8 also has a wear rod 17 beneath the lower surface 11 to provide good steering control.

While the skis of the present invention have a novel curved design as explained above, they may otherwise be conventional in that they may have conventional upturned tips (not shown) at the front and may be of the usual lengths employed in the past for various kinds and sizes of vehicles. The skis may be provided with central keels or may have completely flat lower surfaces since we have found that it is not essential to provide keels; wear bars are sufficient along the bottom of the ski in order to ensure proper steering control.

The skis of the present invention have the desirable effects of creating significant lift while reducing drag, both when the ski is running straight and when it is turning, and of generating lift in a more linear and predictable way as speed increases compared with conventional skis. These advantages are demonstrated by the results of the following tests. The tests were carried out in a water tank because of the difficulty of performing reproducible tests on snow. It is, however, believed that results employed using water as the test medium are directly representative of the results that are obtained on snow, since both media have many similar dynamic properties.

Figure 9:
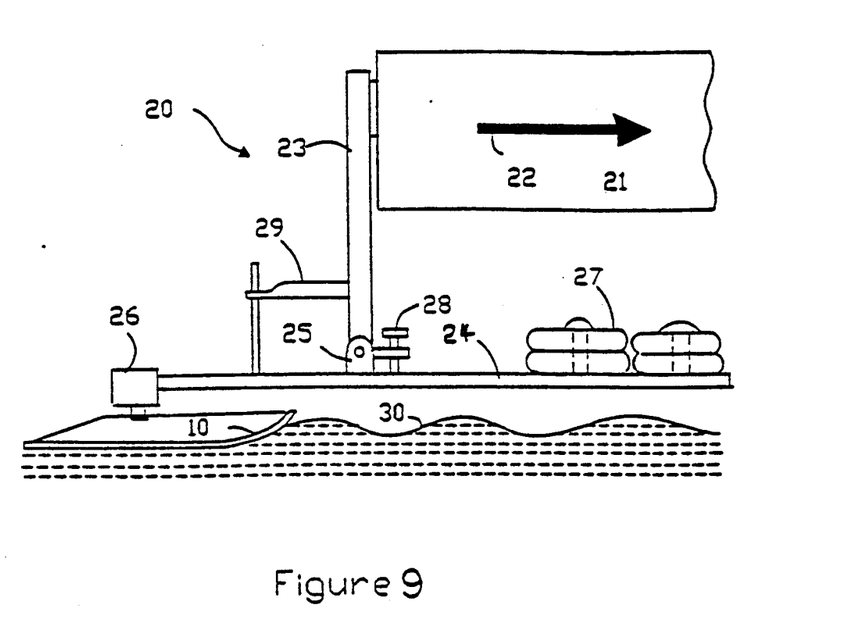
FIG. 9 is a side elevation of test equipment used for carrying out tests described in the disclosure below.
Figure 10:
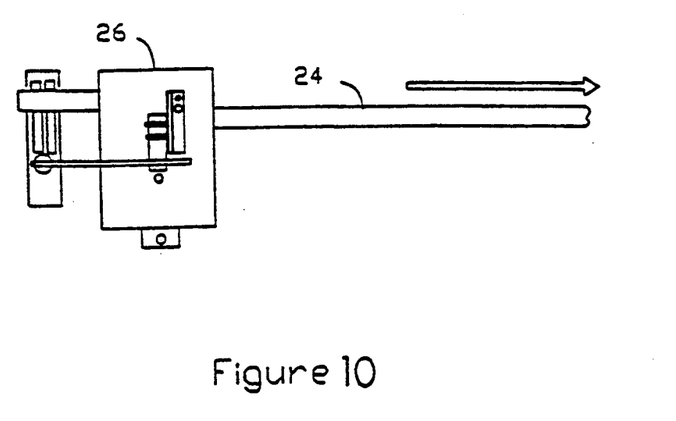
FIG. 10 is a plan view of the equipment of FIG. 9.

The tests were carried out at the Canada Centre For Inland Waters, National Water Research Institute, a Division of Environment Canada, in Burlington, Ontario, Canada. The equipment used to carry out the tests is represented in FIGS. 9 and 10 and is briefly described in the following. The equipment 20 consists of a carriage 21 movable in a horizontal direction as shown by arrow 22. A vertical support arm 23 is firmly attached to the carriage 21 and is movable with it. The lower end of the arm 23 supports a generally horizontal beam 24 via a pivot 25 which allows the beam to rotate freely about a horizontal axis in the plane of the paper.

One end of beam 24 supports a ski 10 via a device 26 for measuring drag produced by the ski 10. The other end of the beam 24 carries counterweights 27 so that the beam tends to rest in the horizontal position. An adjustable depth stop 28 is provided to limit the extent to which the ski 10 may move downwards without limiting the extent to which it may move upwards. A device 29 for measuring lift produced by the ski 10 is connected between the support arm 23 and the beam 24.

The ski 10 dips into a tank of water 30 to a depth suitable for operation as a water ski. During each test run, the carriage is moved horizontally at a predetermined speed so that the ski 10 moves through the water. The measuring device 26 allows the ski to be fixed parallel to the direction of motion of the carriage 21 or at an angle thereto to simulate the ski negotiating a turn.

Figure 11:
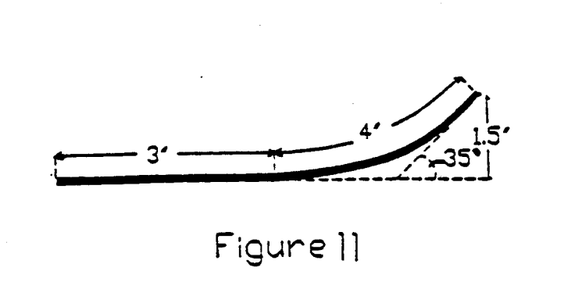
FIGS. 11, 12 and 13 are cross-sections of skis used for the tests, the ski of FIG. 11 being according to the present invention.
Figure 12:
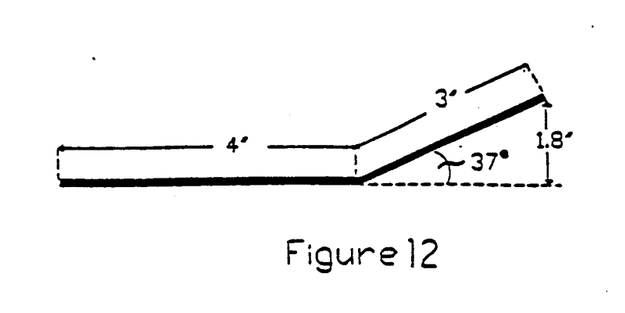
Figure 13:
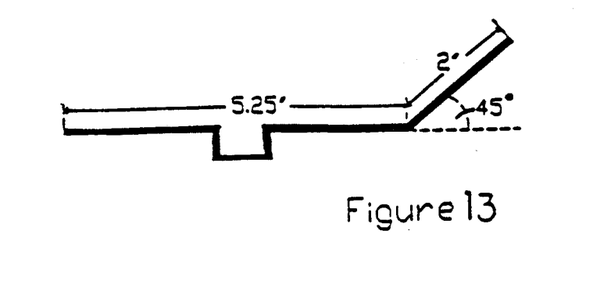

Tests were carried out using three ski designs as shown in FIGS. 11, 12 and 13. FIG. 11 shows a ski according to a preferred embodiment of the present invention defined by the following equation and having a final angle of 35°:

$$y = 0.068 + 0.1x + 0.0046x^2 + 0.009x^3.$$

FIG. 12 shows a ski having a design similar to that of the Warnke patent, but having no keel and an angle of 37° for the curve. FIG. 13 shows a ski which is essentially the same as the Warnke ski in that it is provided with a keel and has a curve angle of 45° preferred by Warnke.

The three skis were tested using the above equipment at various speeds and at various angles to the direction of movement. The conditions were made identical as far as possible for each of the skis. The results are shown in FIGS. 14 to 19 which are graphs explained below.

Figure 14:
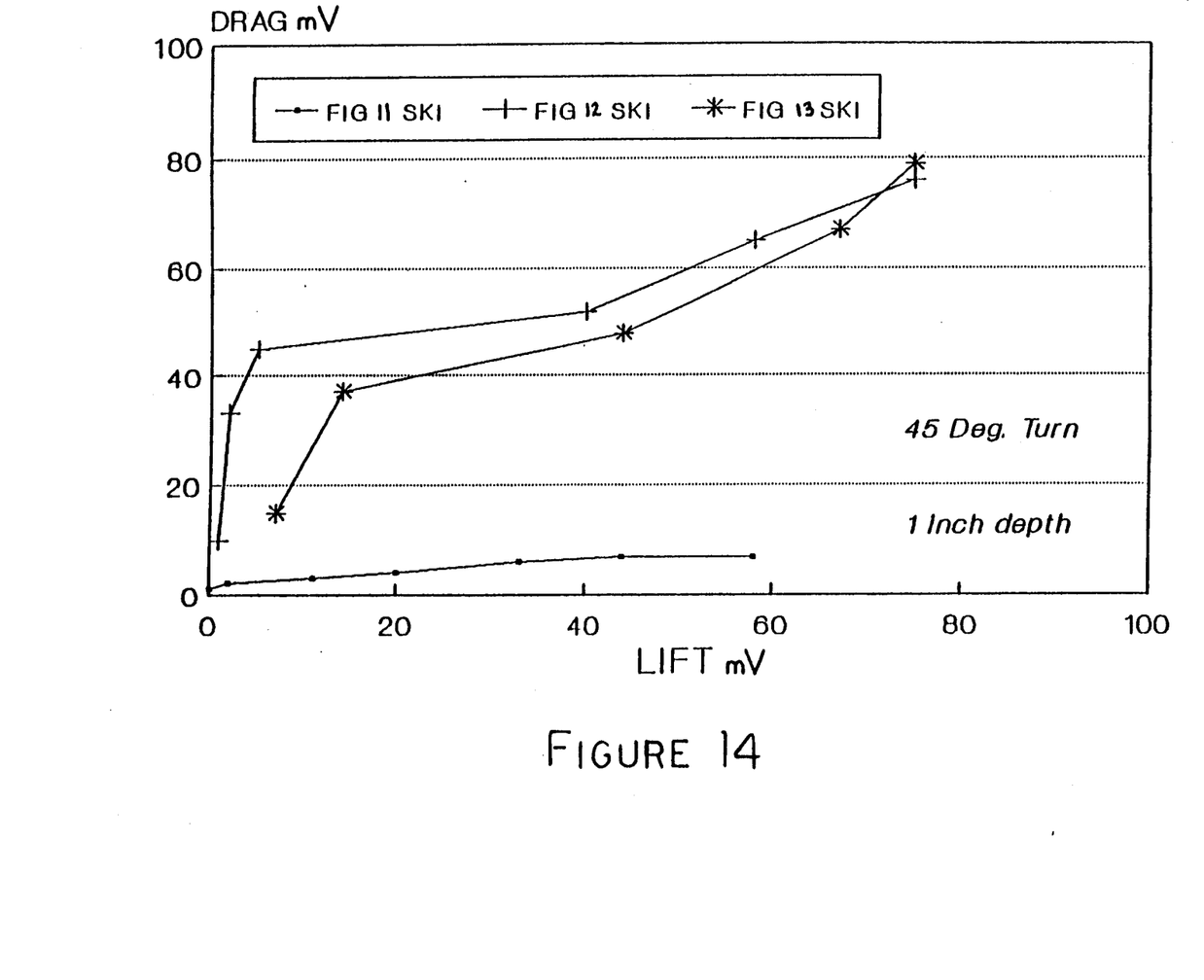
FIGS. 14 to 19 are graphs showing the results of the tests described below.

FIG. 14 is a graph showing drag versus lift generated by each ski when arranged at an angle of 45° to the direction of motion. Each ski was positioned at a depth of 1 inch from the water surface and the carriage was moved at a speed of 1-4 m/sec. It is, very apparent from the graph that the ski shown in FIG. 11 generates much better lift/drag characteristics than the other skis.

Figure 15:
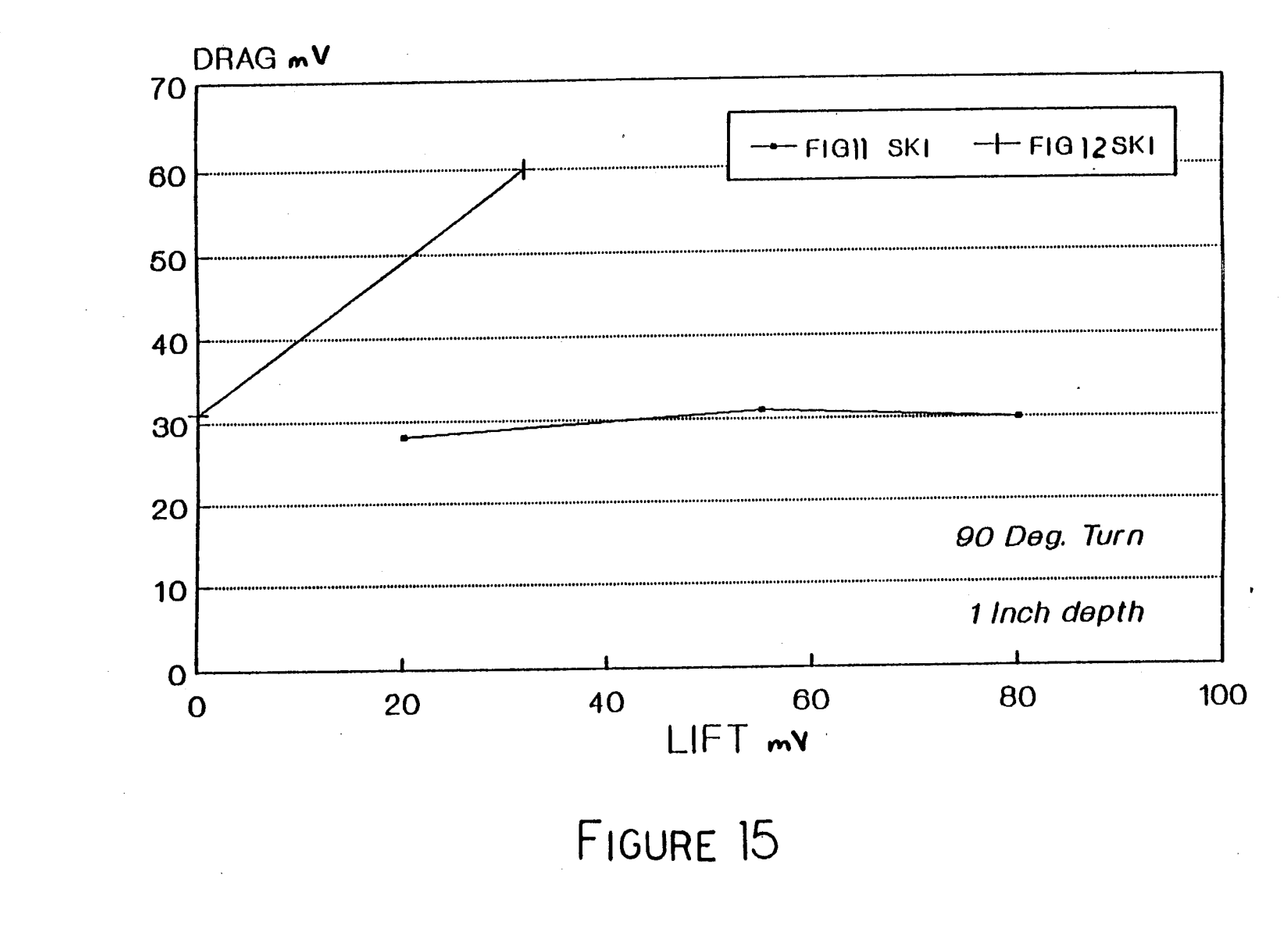

FIG. 15 is a similar graph for the skis arranged at an angle of 90° to the direction of motion. In this and following cases, the ski of FIG. 13 was not tested because it created tremendous spray in the tank, which interfered with the carriage braking system. It is apparent from the 45° test, however, that this ski behaves similarly to the ski of FIG. 12. Again the lift/drag characteristics of the FIG. 11 ski are much superior.

Figure 16:
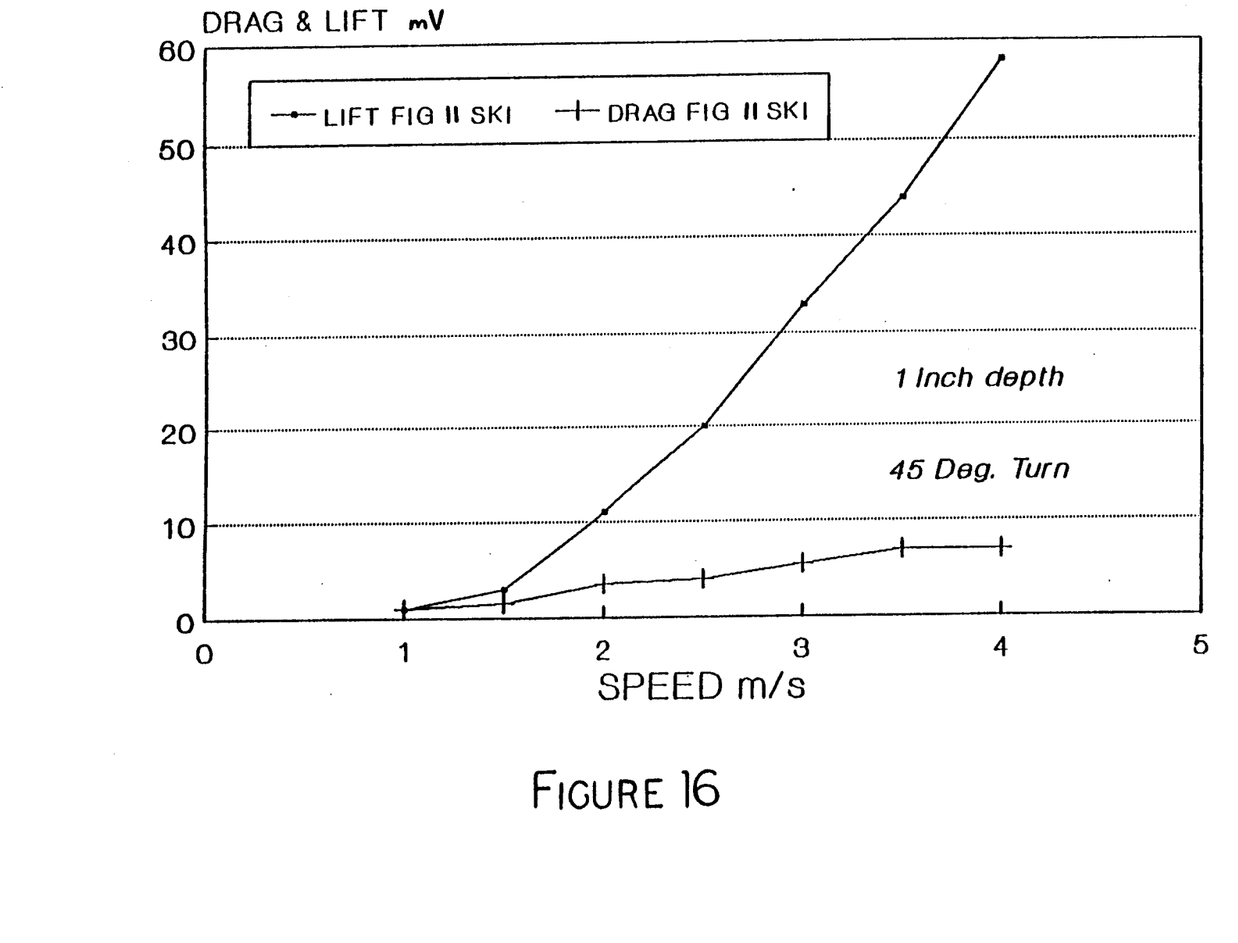
Figure 17:
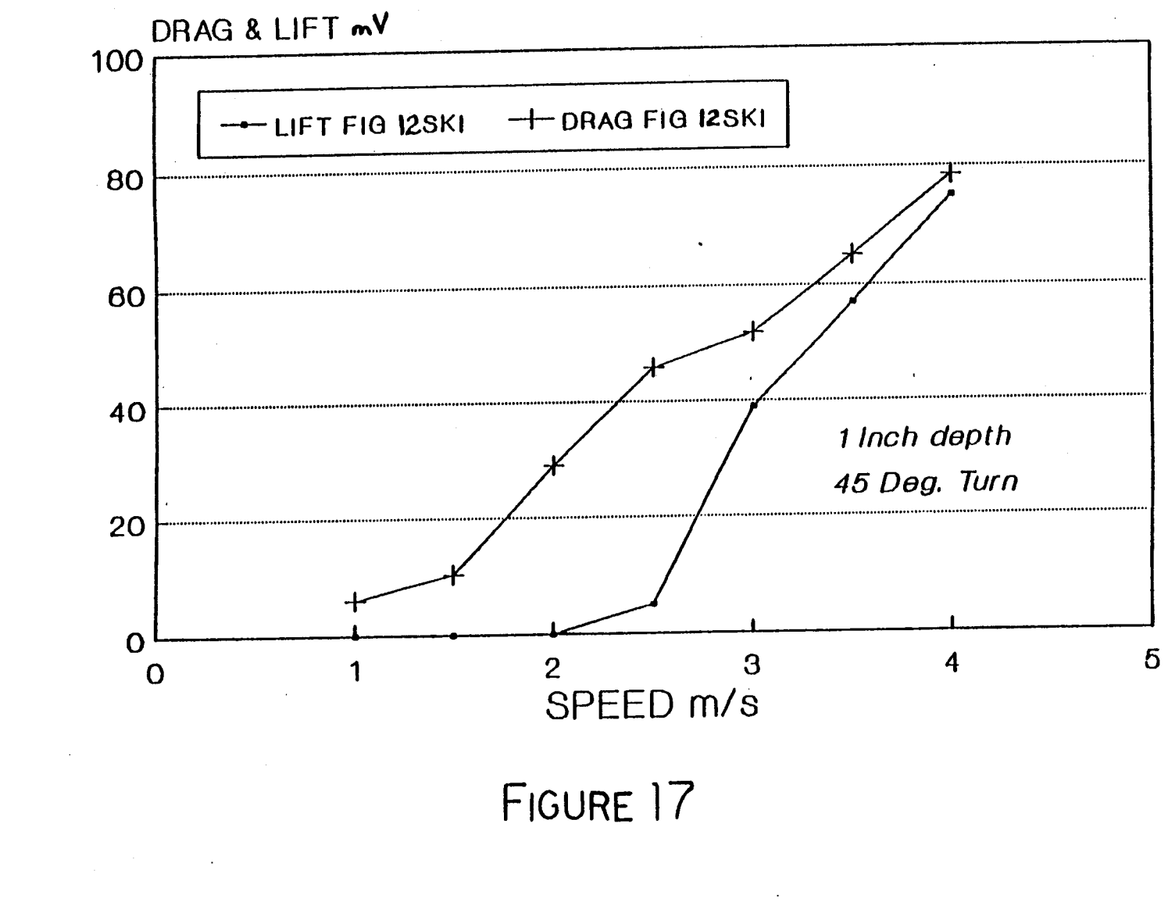

FIGS. 16 and 17 are graphs of lift or drag versus speed of carriage movement for the skis of FIGS. 11 and 12, respectively. The graphs show that the ski of FIG. 11 has a good improvement in lift as speed increases for a modest increase in drag. For the ski of FIG. 12, both lift and drag increase substantially as the speed increases. These graphs are based on data obtained when the skis were angled at 45° to the direction of motion and at a depth of 1 inch.

Figure 18:
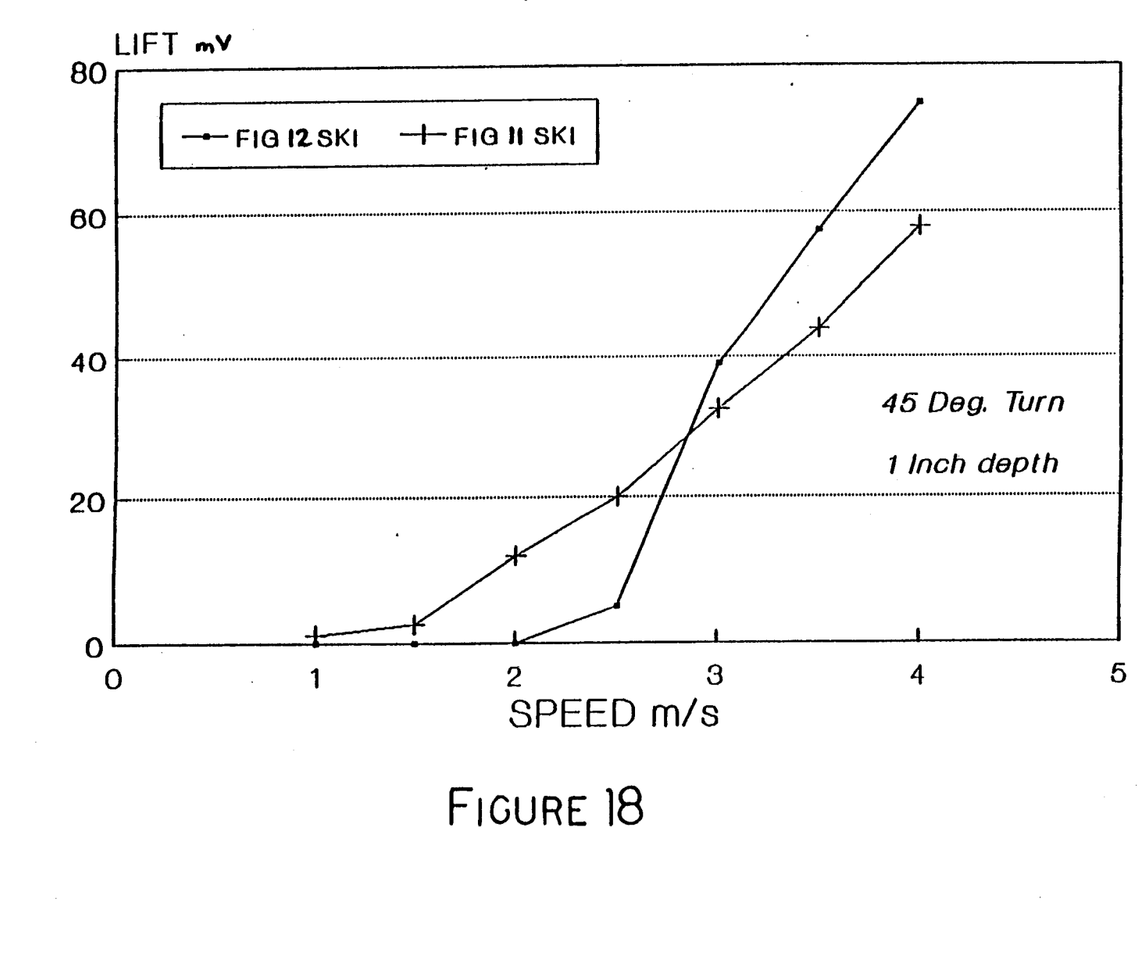

FIG. 18 is a graph showing lift versus speed for the skis of FIGS. 11 and 12. While the ski of FIG. 12 develops greater lift at higher speeds, the increase is not progressive and the ski is therefore unpredictable from a driver's perspective. The resulting risk of rollover makes the generated lift unsafe.

Figure 19:
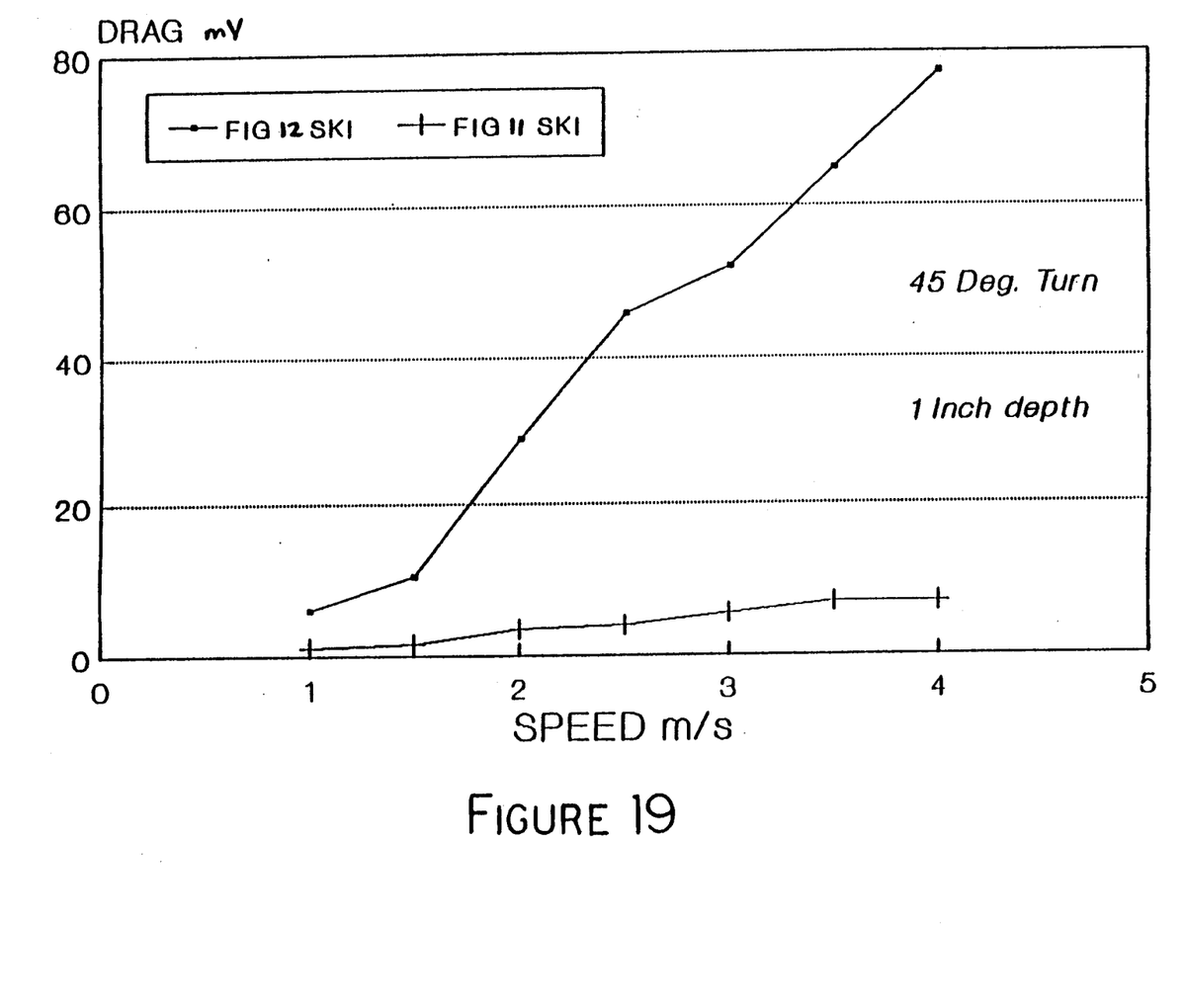

FIG. 19 shows drag versus speed for the skis of FIGS. 11 and 12. In this case, it can be seen that the ski of FIG. 11 is much superior in drag characteristics than the ski of FIG. 12. This allows much greater turning use without rollover than for previous designs. In tests carried out in snow, the FIG. 12 ski was out-performed by a curved edge ski having only ⅜ inch of lift on its upturned edge over a distance of 3 inches. Equivalent tests in water were not possible.

It should be noted that, in the graphs of FIGS. 14 to 19, readings of lift and drag are shown in millivolts. This is because these attributes were measured in the equipment indicated above by "interface sealed superbeam load cells" and the output from these cells was connected to a dual channel graph recorder. Since the purpose of the tests was to provide qualitative comparisons of performance rather than actual values and since the equipment was calibrated in the same way for the tests on the various skis, no attempt was made to convert the millivolt readings to normal units for lift and drag. Actual values could, however, be calculated from the information provided, if necessary.

What we claim is:

1. A steering ski for a vehicle intended for travel over snow and requiring a pair of steering skis arranged generally in parallel, said ski comprising:
   a lower surface for contacting the snow; and
   an upwardly curved lateral edge on each side of the ski in a region of the ski used for support of the vehicle;
   wherein said curved lateral edge on each side of the side defines a convex curved snow-engaging surface which merges smoothly with said lower surface of the ski; and
   wherein said curved lateral edge on one side of the ski has a curve which generates lift when in a turn acting as a leading edge of a leading ski of said pair and said curved lateral edge on an opposite side of said ski has a curve which generates neither substantial drag nor substantial lift when in a turn acting as a leading edge of a trailing ski of said pair, said curve on said opposite side of said ski being shallower than said curve on said one side, said ski being asymmetrical about a transverse axis.

2. A ski according to claim 1 wherein said convex curved surface of said lateral edge on said one side of said ski has a shape comprising an accelerating curve extending upwardly from said lower surface.

3. A ski according to claim 1 wherein said convex curved surface of said lateral edge on said one side of said ski defines an accelerating curve.

4. A ski according to claim 1 wherein said convex curved surface of said lateral edge on said one side of said ski has a minimum radius of curvature of about 0.5 inches at an area where the curved surface merges with the lower surface of the ski.

5. A ski according to claim 1 wherein said curved lateral edge on said one side of said ski has a planar portion adjacent to an outer end of said curved lateral edge.

6. A ski according to claim 1 wherein said curved lateral edge on said one side of said ski has a final angle defined between an outer surface of the lateral edge adjacent to an outer edge of said curved lateral edge and said lower surface of the ski, and wherein said final angle is such that, when said ski is turned to steer a vehicle on snow, an angle between said snow and said curved lateral edge in the direction of movement of the vehicle is no greater than about 45°.

7. A ski according to claim 1 wherein said convex curved surface of said lateral edge on said one side of said ski is defined by the following equation:

$$y = 0.068 + 0.1x + 0.0046x^2 + 0.009x^3$$

wherein:
   y = the vertical coordinate, and
   x = the horizontal coordinate.

8. A ski according to claim 1 wherein said snow-engaging surface of said lateral edge on said one side of said ski of the curved lateral edge of the ski has a shape defined by the equation:

$$y = 0.065 + 0.1106x + 0.026x^2 - 0.0003x^3$$

wherein:
   y = the vertical coordinate, and
   x = the horizontal coordinate.

9. A ski according to claim 1 wherein said curved lateral edge on said one side of said ski has a vertical height above the lower surface of the ski in the range of 0.5 to 4.5 inches over the first 3 inches of horizontal width of the curved lateral edge.

10. A ski according to claim 1 wherein said lower surface of the ski is substantially flat.

11. A ski according to claim 1 wherein said lower surface of the ski includes a generally central longitudinal downwardly projecting keel.

12. A ski according to claim 1 wherein said lower surface of the ski includes a downwardly projecting wear bar.

* * * * *